(12) United States Patent
Sweeney et al.

(10) Patent No.: US 11,756,434 B2
(45) Date of Patent: Sep. 12, 2023

(54) SYSTEM AND METHOD FOR NON-NAVIGATION DATA IN PLATFORM ROUTING

(71) Applicant: BAE Systems Information and Electronic Systems Integration Inc., Nashua, NH (US)

(72) Inventors: Michael R. Sweeney, Windham, NH (US); Christopher T. Marinis, Hudson, NH (US); Jeffrey A. Wallace, Nashua, NH (US); Benjamin P. Wood, Bedford, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 200 days.

(21) Appl. No.: 17/107,288

(22) Filed: Nov. 30, 2020

(65) Prior Publication Data
US 2022/0172628 A1 Jun. 2, 2022

(51) Int. Cl.
*G08G 5/00* (2006.01)
*G05D 1/10* (2006.01)
*G06V 20/17* (2022.01)

(52) U.S. Cl.
CPC .......... *G08G 5/0039* (2013.01); *G05D 1/101* (2013.01); *G06V 20/17* (2022.01); *G08G 5/0034* (2013.01); *G08G 5/0052* (2013.01); *G08G 5/0086* (2013.01)

(58) Field of Classification Search
CPC .......... G01C 21/20; G06T 2207/30212; G05D 1/10; G05D 1/101; G05D 1/106; G05D 3/00; G06V 20/17; G08G 5/0021; G08G 5/003; G08G 5/0034; G08G 5/0039; G08G 5/0047; G08G 5/0052; G08G 5/0078; G08G 5/0086; G08G 5/045
USPC ..... 342/64, 65; 701/3, 29.1, 32.4, 32.5, 400, 701/410, 411
See application file for complete search history.

(56) References Cited

U.S. PATENT DOCUMENTS

| | | | | |
|---|---|---|---|---|
| 8,234,068 B1* | 7/2012 | Young | .......... | G08G 5/0069 701/410 |
| 8,244,418 B1* | 8/2012 | Frank | .......... | G01C 23/00 701/14 |
| 10,006,745 B2* | 6/2018 | Testa | .......... | G01S 3/782 |
| 2004/0233414 A1* | 11/2004 | Jamieson | .......... | G01S 17/42 356/140 |
| 2011/0140873 A1* | 6/2011 | Stahlin | .......... | B60K 37/06 340/438 |

(Continued)

OTHER PUBLICATIONS

International Search Report, PCT/US21/60913, dated Feb. 4, 2022, 16 pages.

*Primary Examiner* — Yonel Beaulieu
*Assistant Examiner* — Aaron K McCullers
(74) *Attorney, Agent, or Firm* — Sand, Sebolt & Wernow LPA; Gary McFaline

(57) ABSTRACT

A platform with an auto-router takes into account non-navigation data, such as IR image sensor data or other non-navigation data to develop a route for a platform. The non-navigation data may be obtained from existing non-navigation sensors carried by the platform. The non-navigation data is fed to an auto-router that takes into account the non-navigation data to generate or dynamically alter a route for the platform.

19 Claims, 5 Drawing Sheets

(56) References Cited

U.S. PATENT DOCUMENTS

| | | | |
|---|---|---|---|
| 2012/0065881 A1* | 3/2012 | McIver | G05D 1/0088 |
| | | | 701/467 |
| 2014/0177914 A1* | 6/2014 | Kuehnle | G06T 7/60 |
| | | | 382/103 |
| 2017/0372463 A1* | 12/2017 | Olsen | G06T 5/50 |
| 2019/0011934 A1* | 1/2019 | DeBitetto | G01C 21/005 |

* cited by examiner

Clutter Map

IR Image

Reference
Imagery

Orthorectified
Imagery

Registration
Result

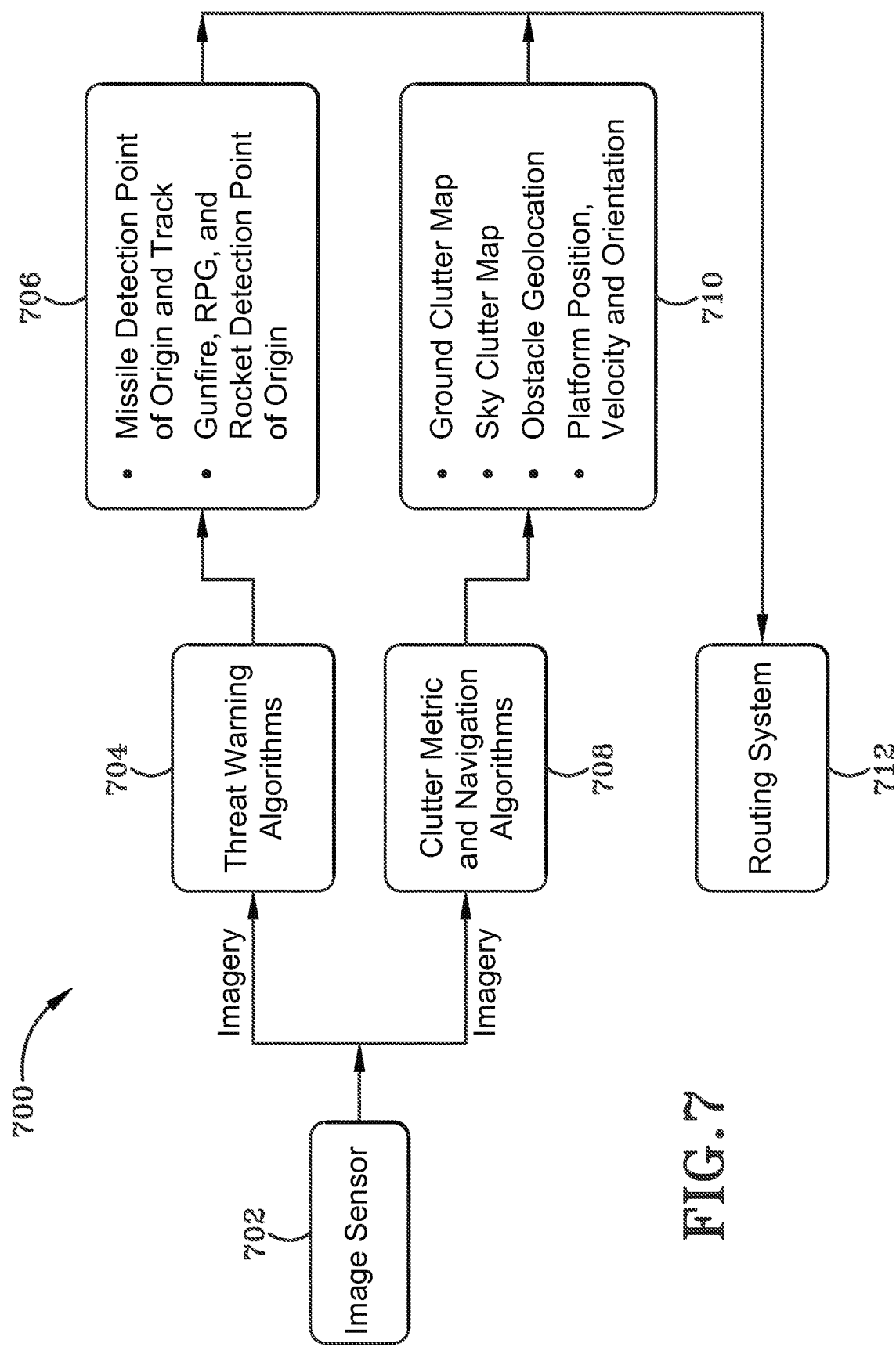

SYSTEM AND METHOD FOR NON-NAVIGATION DATA IN PLATFORM ROUTING

TECHNICAL FIELD

The present disclosure relates to platform routing. More particularly, the present disclosure relates to the use of an auto-router on a platform to generate a route or flight path. In one embodiment, the present disclosure relates to the use of non-navigation data obtained from legacy non-navigation sensors on the platform in the auto-router to provide a more robust flight path or route that takes into account additional data or information.

BACKGROUND

Platforms, such as aircraft, helicopters, unmanned aerial vehicles (UAVs), cruise missiles, and other moving vehicles travel along routes, often which need to be optimized. Mission planning for such platform typically seeks to identify a route from a first location to a second location, or an origin to a destination that balances the risks imposed by some combination of threats, other regions to be avoided, flight time, fuel consumption, strike effectiveness, weather conditions or possibly other factors. Currently, algorithms are used to form the core analysis of an automated route optimizer or "auto-router" in a routing system or mission-planning system of the platform. These auto-routers currently exist on the platforms and are therefore considered to be "legacy" systems.

Currently, legacy auto-routers rely on navigation data, such as global positioning systems (GPS) that are part of the inertial navigation system (INS) that cooperate with the inertial measurement unit (IMU) on the platform. The navigation data is a powerful tool that is used in the legacy routing systems. However, there are instances in which the navigation data may be offline or inoperable. This can result from either threats or adversaries disabling the navigation data or for relatively benign reasons such as a computer malfunction. In either scenario, the absence or lack of navigation data can result in the route of the platform to be disrupted.

Currently, platforms have other non-navigation sensors that are part of other systems of the platform. For example, it is very common that platforms contain threat warning systems which are used to detect an incoming enemy threat or other regions of interest. The threat warning systems are currently used in an independent manner that segregate their data from other systems on the platform. One exemplary threat warning system includes infrared (IR) sensors, such as an IR camera, to capture IR image data. IR image data is often used in threat warning systems to detect disturbances or variances in IR data which can be indicative of threats to the platform. Typically, the threat warning system is coupled with a countermeasure system that implements countermeasures in response to the detection and determination of a threat.

SUMMARY

Issues continue to exist with the navigation systems being susceptible to jamming or otherwise going offline. There is also a need for real-time clutter and obstacle information from an onboard sensor. Thus, a need continues to exist for an auto-router to have multiple input sources to maintain the route of a platform or alter the route of a platform to avoid a threat or high clutter region during the platform's movement. The present disclosure addresses these and other issues by using legacy non-navigation systems, such as a threat warning system, to feed processed sensor data that was traditionally not used for navigation into the auto-router so that the auto-router may adjust the platform route in order to avoid threats as determined by the threat warning system. According to an exemplary embodiment of the present disclosure, legacy IR sensors are used to generate IR sensor data, such as clutter maps, which are fed into the auto-router and the auto-router uses logic to determine whether clutter as observed by the threat warning system should be avoided and the route, as generated by the auto-routing system which hereto for did not account for information from the threat warning system, should be altered to dynamically update and alter the route of the platform so as to avoid the detected clutter from the IR sensor.

In one aspect, an exemplary embodiment of the present disclosure may provide a system comprising: a platform adapted to move from a first location to a second location; a navigation system on the platform; navigation data generated by the legacy navigation system; a legacy non-navigation system on the platform, the legacy non-navigation system including at least one non-navigation sensor; legacy non-navigation sensor data generated by the non-navigation sensor data; a routing system on the platform, wherein the routing system receives the legacy non-navigation sensor data and the navigation data; a route for the platform generated by the routing system, wherein the route is based on both the legacy non-navigation sensor data and the navigation data. This exemplary embodiment or another exemplary embodiment may further provide wherein the legacy non-navigation system is a threat warning system and the legacy non-navigation sensor data is IR sensor data; an IR clutter map generated by the threat warning system based on the IR sensor data, wherein clutter regions are identified in the IR clutter map; This exemplary embodiment or another exemplary embodiment may further provide logic to determine whether the clutter regions need to be avoided by the platform; wherein the route is altered based on the IR clutter map for the platform to avoid the clutter regions that have been determined to be avoided by the platform as the platform traverses the route.

In another aspect, an exemplary embodiment of the present disclosure may provide a method comprising: receiving sensor data from a legacy sensor carried by a platform, wherein the legacy sensor is part of a non-navigation system on the platform; transforming the sensor data into a format to be used by a routing system on the platform; generating a route by the routing system based, at least in part, on the sensor data that has been transformed into the format for use by the routing system; and moving the platform along the route, wherein the route is based, at least in part, on the sensor data from the legacy sensor that is part of the non-navigation system on the platform. This exemplary method or another exemplary method may further provide, wherein the legacy sensor is an image sensor, further comprising: receiving image sensor data from the legacy sensor carried by the platform; processing the image sensor data into the format for use by the routing system; and generating the route based, at least in part, on the image sensor data having been processed into the format for use in the routing system. This exemplary method or another exemplary method may further provide, wherein the non-navigation system on the platform is a legacy threat warning system, further comprising: capturing the image sensor data during active monitoring for threats by the threat warning system;

providing a clutter map or threat information generated in response to processing the image sensor data from the threat warning system to the routing system; and generating the route based, at least in part, on the clutter map or threat information generated in response to processing image sensor data from the legacy threat warning system. This exemplary method or another exemplary method may further provide, wherein the image sensor is a part of the legacy threat warning system, further comprising: capturing IR image data by the image sensor while scanning for threats to the platform; processing the IR image data to generate a clutter map; wherein the clutter map is in the format for use by the routing system; routing the platform based, at least in part, on the clutter map. This exemplary method or another exemplary method may further provide ranking clutter in the clutter map by one of (i) the threat warning system and (ii) the routing system; and generating the route based, at least in part, on the ranked clutter. This exemplary method or another exemplary method may further provide ranking the clutter based, at least in part, on pixel intensity as observed by the image sensor in the legacy threat warning system; wherein the clutter is ranked into at least two categories, wherein at least one category results in the routing system altering the route; determining that the ranked clutter is in the at least one category; and altering the route in response to the determination that the ranked clutter is in the at least one category. This exemplary method or another exemplary method may further provide altering the route, based on instructions from the routing system, while the platform is moving in response to active monitoring of IR image data observed by the image sensor on the legacy threat warning system. This exemplary method or another exemplary method may further provide, wherein processing the IR image data to generate the clutter map includes (i) ortho-rectifying the captured IR image data; (ii) registering the ortho-rectified IR image data with a reference image to obtain a registration result; and (iii) determining a location of the platform based on the registration result, and the method comprising: guiding the platform based on the location determined from the registration result of registering the ortho-rectified IR image data obtained from the legacy sensor in the legacy threat warning system with the reference image.

This exemplary method or another exemplary method may further provide receiving navigation data from a legacy navigation system on the platform, wherein the navigation system includes at least one of a global positioning system and an inertial navigation system; generating the route by the routing system based, at least partially, on the navigation data for use by the routing system; moving the platform along the route, wherein the route is based on the sensor data and the navigation data. This exemplary method or another exemplary method may further provide determining that the navigation system is not operable; and continuing to move the platform along the route while relying on the sensor data and not relying on the navigation data while the navigation system is inoperable. This exemplary method or another exemplary method may further provide wherein when the legacy navigation system is inoperable while the platform is moving, bounding a portion of the sensor data based on a contrast between two regions of the sensor data. This exemplary method or another exemplary method may further provide detecting a horizon line in the sensor data obtained by the legacy sensor; wherein the portion of the sensor data that is bounded is based on a horizon line detected in the sensor data. This exemplary method or another exemplary method may further provide reducing inertial drift calculations in response to integrating angular rates of platform attitude while the platform is moving and after it has been determined that the legacy navigation system is inoperable. This exemplary method or another exemplary method may further provide weighting the sensor data at a first weight and weighting the navigation data at a second weight when using both the sensor data and the navigation data to generate the route, wherein the first weight and the second weight are different.

Another exemplary method may further provide for dynamically updating the route in response to sensor data being collected while the platform moves. This exemplary method or another exemplary method may further provide determining that a region is to be avoided based on the sensor data obtained from the legacy sensor; determining, while the platform is moving, that the route will traverse the region that is to be avoided; bounding the region that is to avoided; generating a radius around the bounded region to be avoided; and altering the route to move the platform around the radius so as to avoid the bounded region.

In yet another aspect, an exemplary embodiment of the present disclosure may provide a computer program product including one or more non-transitory machine-readable mediums encoded with instructions that when executed by one or more processors cause a process to be carried out for platform routing, the process comprising: receiving sensor data from at least one sensor carried by a platform, wherein the sensor is part of a non-navigation system on the platform; transforming the sensor data into a format to be used by a routing system on the platform; generating a route by the routing system based, at least in part, on the sensor data that has been transformed into the format for use by the routing system; and moving the platform along the route, wherein the route is based, at least in part, on the sensor data from the sensor that is part of the non-navigation system on the platform.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 7 (FIG. 7) is a flow chart depicted an exemplary method or process according to an exemplary embodiment of the present disclosure.

Similar numbers refer to similar parts throughout the drawings.

DETAILED DESCRIPTION

Figure 1:
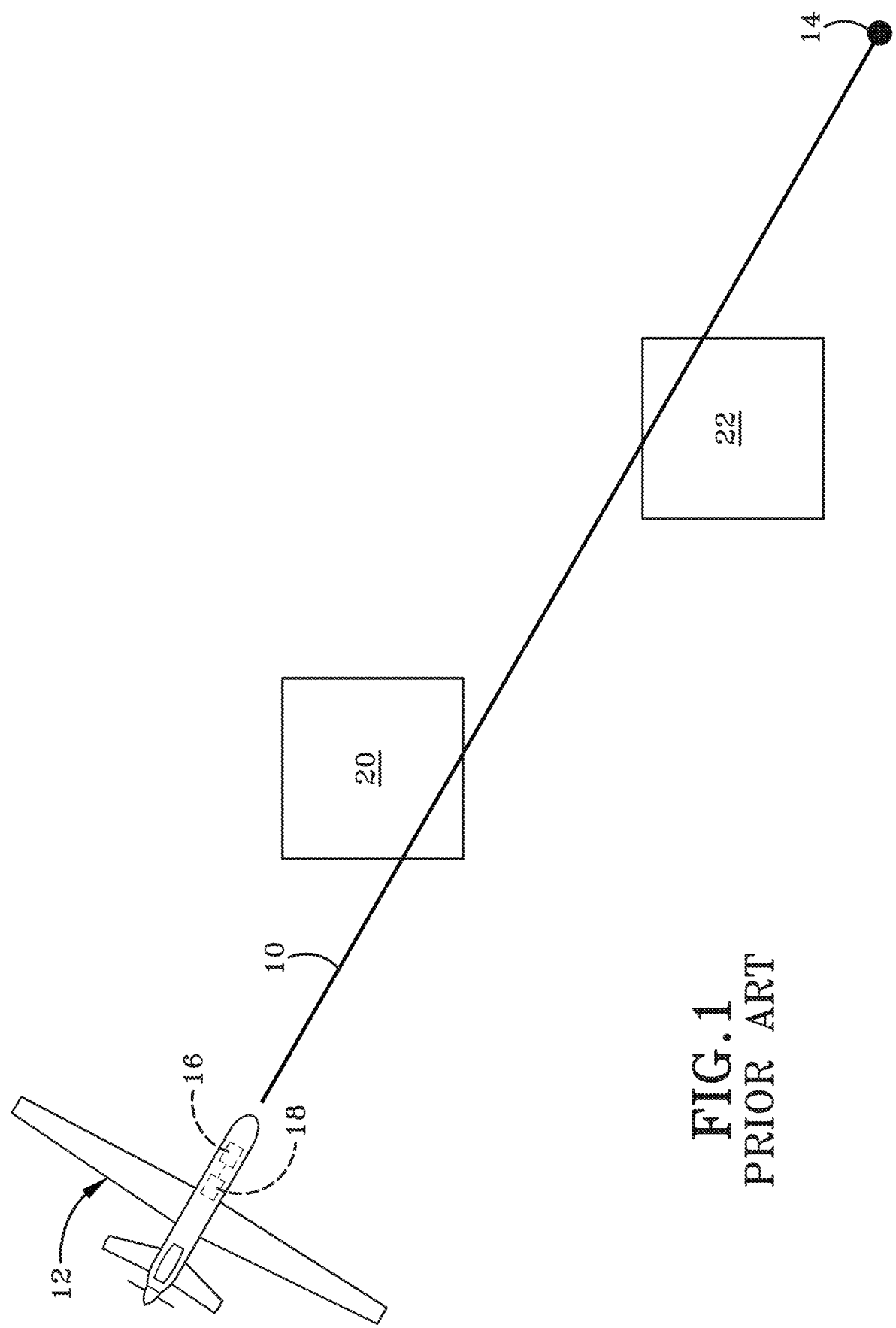
FIG. 1 (FIG. 1) is an operational diagrammatic view of a platform traversing or moving along a route generated by an auto-router.

FIG. 1 depicts an operational diagrammatic view of a flight path or route 10 that is traversed by a platform 12 from a first location to a second location or destination 14. On platform 12, there is a legacy routing system or auto-router 16 coupled with an inertial navigation system (INS) 18. The INS 18 provides geolocation or navigation data for the platform 12 to the auto-router 16 so that it may develop the flight plan or route 10.

The prior art of FIG. 1 indicates that there may be one or more regions along or below the route 10 that the platform 12 will cross over or near. Particularly, the route 10 passes over a first region 20 and a second region 22. Within the first region 20 and the second region 22 there may be items that should be avoided by the platform. They may contain either threats that threaten the platform, or clutter sources that reduce the capability of the onboard defensive systems. The threats could originate from sources of electromagnetic radiation emanating outward therefrom. The threats from the first region 20 and/or the second region 22 are not considered by the auto-router or the INS when developing a flight plan or route 10 to the destination or end point 14. Thus, even though there is potential for threats, such as electromagnetic (EM) interference, to the electronic systems of the platform, the route still passes over the first region 20 and the second region 22. This may cause issues, concerns, or reduce the efficiency of the electronic systems of platform 12. Issues continue to exist with auto-router systems for platform inasmuch as they are software that run on a platform such as an aircraft or helicopter, regardless of whether it is manned or unmanned, which is susceptible to input variances that can disrupt or otherwise disable the auto-router. Thus, a need continues to exist for auto-routers to be more threat-agnostic and be capable of accepting more types of data input streams to perform the routing calculations or flight plan optimizations for the platform or vehicle. As detailed herein, the issues that arise with the platform and current auto-router 16 are addressed by embodiments of the present disclosure depicted in FIG. 2-FIG. 7.

FIG. 2-FIG. 7 disclose various aspects of the present disclosure in providing a new and improved way for utilizing additional data that is already on the platform from or produced by other legacy sensors to alter or change the route or flight plan of the platform utilizing the existing legacy navigation systems, such as the auto-router and INS, but feeding those systems additional data that would typically not be utilized for navigation. Stated otherwise, the system and method of the present disclosure provides non-navigation data obtained by non-navigation sensors on the platform and uses the same in a new manner to provide an improved route plan to avoid regions along the route that may cause interference to various electronic systems of the platform 12.

In one particular embodiment, the non-navigation sensors are legacy sensors on the platform. The term "legacy" as used herein refers to existing items on the platform that can be retrofitted or used in a new and different way than were previously done in the past. For example, some of the sensors discussed herein are infrared (IR) image sensors that are part of a legacy threat warning system. The legacy IR sensors on the legacy threat warning system are image sensors that capture IR data to determine whether there is a threat on the ground or other location, and whether a countermeasure needs to be deployed from the platform to defend against that threat. Prior to the present disclosure, the legacy IR sensors in the legacy threat warning system were not used for navigation purposes, however, were used for defensive purposes. The present disclosure takes advantage and utilizes data from existing non-navigation sensors and applies it to the auto-router so the auto-router may determine a better route to avoid regions that could pose a threat to the platform. Another embodiment discussed herein relates to the use of navigation based on, or at least in part on, the non-navigation data, such as IR data from the legacy IR image sensors on the threat warning system, to navigate the platform in the event the primary navigation system, such as the INS and its global positioning system (GPS), are denied or otherwise offline.

Figure 2:
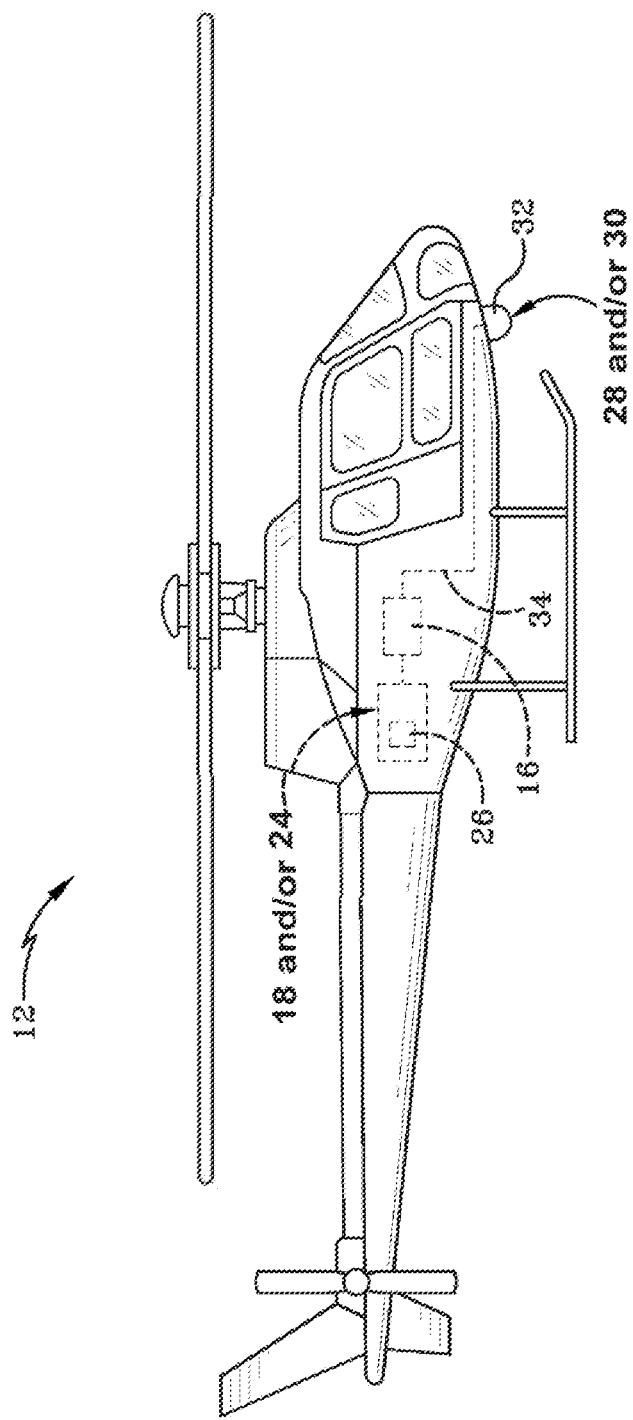
FIG. 2 (FIG. 2) is a diagrammatic view of an exemplary platform including a navigation and a legacy non-navigation system with a non-navigation sensor to provide non-navigation data to an auto-router that is used to generate a route for the platform according to an exemplary aspect of the present disclosure.

FIG. 2 depicts an exemplary platform 12. Platform 12 may be any air-based, ground-based, subterranean, or sea-based vehicle. Further, the platform 12 may be any manned or unmanned platform. Although FIG. 2 depicts, generally, a helicopter, any type of vehicle, such as a plane, jet, or unmanned aerial vehicle (UAV) will suffice. The platform 12 includes a legacy navigation system 24 which may be embodied as the INS 18 that includes an inertial measurement unit (IMU) 26. Coupled with the INS is a legacy auto-router 16 that is adapted to generate the flight path or route 10 of platform 12. The route may traverse first region 20 and second region 22.

The platform 12 additionally includes a legacy non-navigation system 28. The non-navigation system in one example is a system that traditionally has not be employed for navigation purposes. In one example, the non-navigation system may be embodied as a threat warning system 30 that includes a legacy non-navigation sensor 32. The legacy non-navigation sensor 32 may be any type of sensor that has not previously been used for navigation purposes. In one particular embodiment, the legacy non-navigation sensor is an IR image sensor that captures IR data or IR sensor data. The legacy non-navigation sensor can be an imaging sensor providing image data for the threat warning system or other non-navigation system. The non-navigation system 28 is coupled to the auto-router 16 via a link 34 which may be a wired or wireless link capable of transmitting electronic data between the non-navigation system 28 and the auto-router 16. Further, while FIG. 2 depicts that the non-navigation system 28 is carried by the platform 12, it is not necessarily required. For example, the non-navigation system 28 may be located remote from platform 12 to gather non-navigation data and wirelessly transmit it to the auto-router 16 so that the auto-router 16 can develop the route 110 (FIG. 6) in accordance with an aspect of the present disclosure so as to allow the platform 12 to avoid first region 20 and second region 22.

Typically, the auto-routers are commonly found on unmanned vehicles or unmanned platforms. The auto-routers receive input information, such as GPS data from an inertial navigation system (INS) containing an inertial measurement unit (IMU) that are able to detect an obstacle that the platform needs to be routed around in order to avoid the obstacle. The obstacle may be a physical obstacle or an area that is known to be avoided, such as an enemy or hostile territory or another territory that is otherwise to be avoided for other reasons. This allows the auto-router to autonomously navigate the platform along a desired flight path or route. The present disclosure addresses the needs associated with current auto-routers by providing the auto-router with additional data inputs to be used in its optimization and flight plan development by receiving inputs from other legacy sensors that are currently already existing on the platform. One particular exemplary embodiment uses legacy threat warning sensors from a threat warning system (TWS) on the platform. In one particular embodiment, the sensors on the TWS are infrared image sensors. Thus, according to an exemplary aspect of the present disclosure, the system of the present disclosure is able to use and implement infrared (IR) image data obtained from legacy sensors on a TWS on a platform and feed the IR data captured from the IR image sensors to the auto-router so that it may use the IR data to develop a route or flight plan for the platform.

Typically, threat warning sensors on the TWS are not fed to the auto-router, thus the installation of a wired or wireless link between the IR image sensor and the auto-router must be installed. This may be accomplished by physically installing a wire in the platform between either directly from IR image sensor to the auto-router or by installing a wire from a bus on the TWS to feed the IR image data to the auto-router. Otherwise, a wireless link may be established between either the IR image sensor or the bus on the TWS to effectuate the transmission of the IR image data to the auto-router. Thus, the remaining balance of the system are legacy systems currently in existence in or on a platform.

Figure 3:
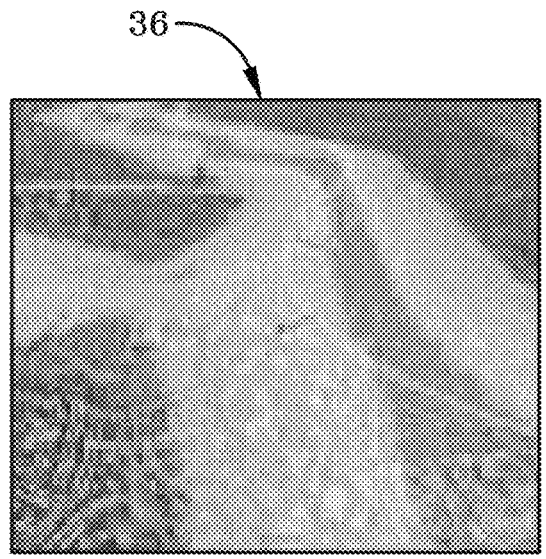
FIG. 3 (FIG. 3) is a view of an exemplary clutter map generated in response to processing image data captured by a legacy non-navigation system.

FIG. 3 depicts some exemplary sensor data from the legacy non-navigation sensor 32. More particularly, FIG. 3 depicts an exemplary clutter map 36 that would be generated by processing data from an IR image sensor in a threat warning system 30. The clutter map 36 is generated in response to the IR image sensor capturing image data as the platform 12 moves from a first position to a second position. The clutter map is indicative of IR intensity values, or other spatial, temporal, or spectral information observed by the image sensor. As will be described in greater detail herein, the image sensor that captures the image that is processed to produce the clutter map in a manner such that the clutter map is sent to the auto-router. The auto-router may be programmed, via programmable logic, to determine whether the clutter meets or fails to meet a certain threshold value to result in the platform needing to avoid the area from which the IR source is emitted. Previous to the present disclosure, clutter maps were commonly used for non-navigation purposes in threat warning systems, such as threat warning system 30, to determine if IR emissions were indicative of a threat or another item that would be detrimental to the platform 12. The threat warning system 30 typically determines that if the IR data is a threat, then a countermeasure would need to be deployed from a countermeasure system carried by the platform 12. Some exemplary countermeasures include flares, chaffs, or directed energy to disable or jam/confuse the incoming threat to the platform 12.

Figure 4:
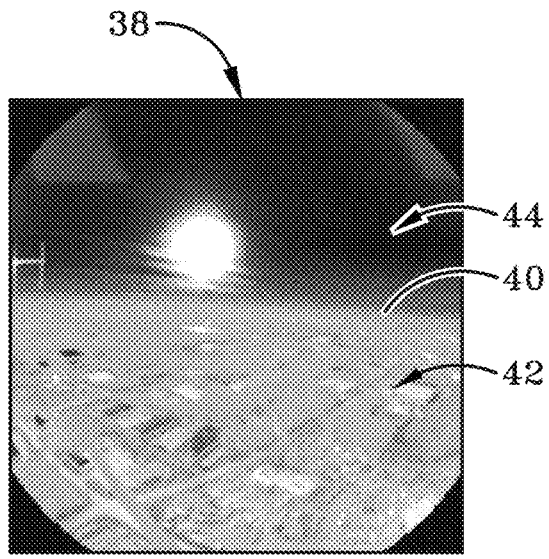
FIG. 4 (FIG. 4) is an exemplary image captured by a non-navigation system depicting a horizon line separating a sky region and a ground region.

FIG. 4 depicts an exemplary IR image 38 captured from the platform 12. Within the IR image 38 is a horizon or horizon line 40 that separates a ground region 42 from a sky region 44 in the IR image 38. The horizon or horizon line 40 is utilized by the auto-router 16 to perform bounded inertial navigation as discussed in greater detail herein with respect to the operation of the system.

Figure 5:
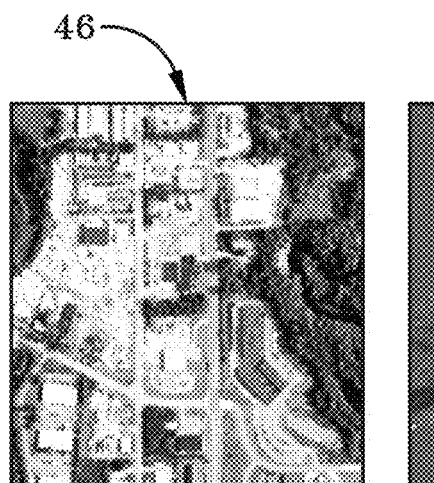
FIG. 5 (FIG. 5) is three exemplary images including a reference image, an ortho-rectified image, and a registration result of the ortho-rectified image overlaying the reference image.
Figure 5:
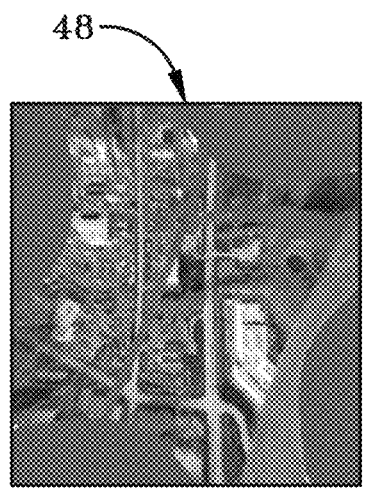
Figure 5:
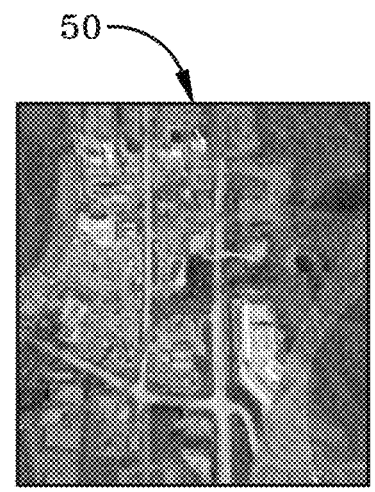

FIG. 5 depicts a reference image 46, an ortho-rectified image 48, and a registration result 50. The reference image 46 is a pre-stored image obtained from an external source such as satellite imagery. The ortho-rectified image 48 is an image captured from a legacy IR image sensor. The registration result 50 is the result of registering or overlaying the ortho-rectified image 48 over the reference image 46. As will be described in greater detail herein, the registration result 50 can be used by the auto-router to determine global localization of the platform 12 in the event the primary navigation system 24, namely, the GPS in the INS 18 is disabled or otherwise offline. The operation of the global localization is described in greater detail herein.

Having thus generally described the configuration of the system, reference will be made, in the following paragraphs, to the operation of the present disclosure.

In operation, and generally, the use legacy non-navigation data, such as IR data, in the auto-router enables the auto-router to now operate in two modes. Typically, an auto-router only operates in a first mode which relies strictly on GPS data provided by the INS. However, the present disclosure and its incorporation of the IR data from the IR image sensor on the TWS allows the auto-router to operate now in a second mode. The second mode operates by incorporating the IR image data and uses an optimization processes to now take into account the effect both the GPS data from the INS as well as the IR image data and the clutter maps generated by processing the IR image data to optimize the flight plan. This effectively allows the auto-router to now continue routing or providing a flight plan for the platform in the event the platform enters an environment where GPS or the INS is denied.

In a scenario where the GPS or INS is denied, either by an outside source or whether the INS simply "goes down", the IR data can be used to obtain platform attitude using the horizon line 40 to establish a bounded location from the imagery that is compared against reference imagery that may be stored either on a memory on the platform or a remote memory to obtain the platform's location and input this information into the auto-router to continue the routing or flight plan in a manner that will provide safe operation for the platform.

Although reference has primarily been made to using legacy IR image sensors on a TWS, other legacy non-navigation sensors could be utilized to develop the flight plan by sending their respective data to the auto-router. For example, other legacy sensors on the aircraft or platform such as accelerometers sensing accelerations experienced during rotation, translation, velocity/speed, location traveled, elevation gained; gyroscopes sensing movements during angular orientation and/or rotation, and rotation; altimeters sensing barometric pressure, altitude change, elevation descended/climbed, local pressure changes, submersion in liquid; impellers measuring the amount of fluid or air passing thereby; Audio Sensors sensing local environmental sound levels, sound detection, Photo/Light sensors sensing ambient light intensity, ambient; Day/night, sleep, UV exposure; sensors sensing light wavelength; Temperature sensors sensing temperature, ambient air temperature, and environmental temperature, could be connected to the auto-router to provide their input data in order to optimize the flight plan for the platform.

With respect to the use of other non-navigation sensors to generate non-navigation data that is to be used in the routing system 16, one particular example could take advantage of sensor data gathered by a pressure altitude sensor and altimeter. Namely, a pressure altitude sensor and altimeter could be used to get altitude when GPS denied. This information may be provided to routing system 16 to develop the route 110 that is configured to avoid certain regions based on the non-navigation data provided by the non-navigation sensors.

Figure 6:
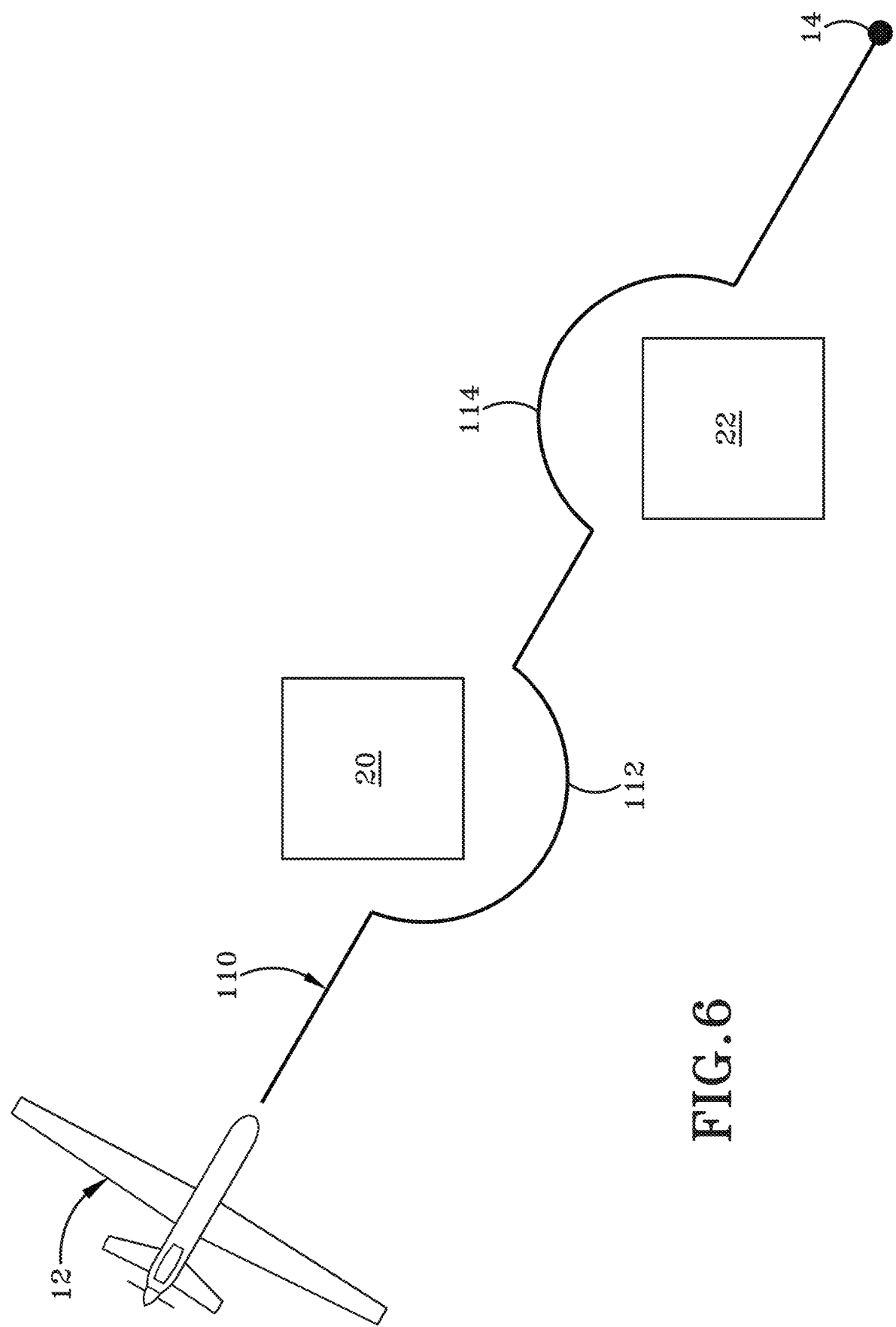
FIG. 6 (FIG. 6) is an operational diagrammatic view of a platform traversing or moving along a route that avoids regions based on non-navigation data obtained from the non-navigation system.

One exemplary threat warning system 30 and its respective IR image sensors is commercially known as the 2CAWS system. The 2CAWS system, or any other threat warning system 30, generates raw imagery that is processed to determine areas where there are bright light sources, electromagnetic radiation sources, or other invisible or visible disturbances. The processing is able to detect levels of different EM intensities from that image. The different EM intensities are processed to score each pixel with a clutter value. In one example, the clutter value score may be scored from high, medium, to low. However, any interval of scoring or ranking the pixel intensities is possible. For example, instead of three values (high, medium, and low), there may be two, four, five, six, seven, eight, nine, ten or more interval values on how much granularity of the intensity is required depending on the application-specific requirements. Effectively, the image processing determines how much clutter is present. In one example, the scoring of the pixels results in ranking the clutter based, at least in part, on pixel intensity as observed by the image sensor in the legacy threat warning system. The interval values of pixel intensity that are ranked can be evaluated by the threat warning system, the auto-router 16, or another logic to evaluation whether the flight path needs to be altered to avoid one of the regions, such as, the first region 20 or the second region 22. Although the values have been identified in three values as described above, the clutter in clutter map 36 is ranked into at least two categories, wherein at least one category results in the routing system altering the route, as shown in FIG. 6. The system, namely, the auto-router 16, the threat warning system 30, or another logic determines that the ranked clutter is in the at least one category associated with needing to alter the route. Then, the route 110 may be altered in response to the determination that the ranked clutter is in the at least one category that would necessitate in the platform 12 to avoid either the first region 20, the second region 22, or both. Although pixel intensity is used to rank the clutter, other thresholds may be utilized to rank the clutter instead of pixel intensity. Stated otherwise, pixel intensity is not the only measure of clutter level.

In operation, the auto-router takes into account the GPS data provided from the INS. However, in accordance with an aspect of the present disclosure, the auto-router is also now taking into account the IR image data, in the form of clutter maps or clutter imagery obtained from processing the data from the legacy IR image sensors on the threat warning system 30, in addition to the GPS data provided from the INS 18 on the platform 12. The auto-router 16 or the threat warning system 30 may be programmed to weight the input streams based on application-specific needs. For example, the auto-router 16 or the threat warning system 30 may be programmed to weight the GPS data provided by the INS 18 more favorably or more heavily than the IR image data which may be used to supplement the GPS data. However, there may be other application-specific needs in which the GPS data provided by the INS and the IR image data, in the form of clutter maps or clutter imagery, provided by the threat warning system 30, may be equally weighted in importance when developing the flight plan or route in the auto-router. Further, there may be a scenario where the IR image data is weighted more heavily or more favorably over the GPS data when developing the flight plan or route for the platform. Each of these weighted relationships between the data stream's input into the auto-router would depend on the mission of the platform. For example, if the mission of the platform is one that would be very sensitive to clutter; for instance, if the platform wanted to fly a route where false visual IR false alarms were very sensitive, then the auto-router may weigh the GPS data from the INS more favorably. Alternatively, a scenario can be envisioned where if clutter imagery is less relevant to the flight plan but the area is known to be a GPS-denied environment, then the auto-router can be programmed to more heavily weight or favor the IR image data over the GPS data knowing that the GPS data will likely be denied.

The auto-router develops the optimal flight path for the platform. Areas of high clutter are often "clumpy." This is can be due to heat sources or solar reflection and emission from certain types of structures or terrain. This, after image processing, results in a region on the clutter map of high clutter intensity. In the auto-router, processes, methods, instructions, or algorithms will account for these clumpy areas of high clutter and use optimization metrics to avoid these areas of the high clutter or clumpy areas in the image data in order to route the platform away from said clutter area. Thus, as shown in FIG. 1, if the normal flight path or route 10 would fly over that clutter area, represented by first region 20 and second region 22, as strictly determined solely by GPS data, the auto-router of the present disclosure will take into account the clutter values and instruct the flight plan to optimize and change, in a dynamic real-time manner, to avoid the clutter area, provided that the algorithm was weighted appropriately that would value the clutter areas of higher values to be avoided than the GPS provided data.

FIG. 6 depicts an exemplary flight path or route 110 generated by the auto-route 16 that takes into account the clutter map 36 obtained from the legacy non-navigation sensors 28, namely the IR sensors on the threat warning system 30. The platform 12 obtains the IR sensor data and determines that the clutter in the clutter map 36 that corresponds to the first region 20 and the second region 22 should be avoided. The auto-router 16 generates a first radius path 112 to avoid the first region 20 and a second radius path 114 to avoid the second region 22 so the platform may continue along its route 110 towards the destination 14.

As indicated previously, if the GPS data was weighted more favorably, there could be a programmed override which would still allow the flight plan to continue through the cluttered area if that application-specific flight plan determined that the GPS data was weighted more favorably or heavily than the clutter data. Returning back to the example in which the cluttered area was to be avoided based on the weighting algorithm of the auto-routing optimization algorithm, the auto-router could develop a "keep out" radius bounded by the cluttered area and establish a radius of departure (i.e., the radius path 112, 114) to fly around the keep out zone.

In this example, logic on the platform 12, such as logic in the auto-router 16 or the threat warning system 30 determines that a region is to be avoided, such as the first region 20 or the second region 22, based on the sensor data obtained from the legacy sensor 32. Then, it is determined, while the platform 12 is moving along route 110, that the route 110 will traverse the region that is to be avoided, again, either first region 20 or second region 22. The auto-router may then bound the first region 20 or the second region 22 through a series of instructions in the auto-router that determine the location and a reasonable distance needed to avoid the region. The auto-router 16 or logic in the auto-router may then generate a radius around the bounded region to be avoided. Then auto-router 16 then alters the route 110 to move the platform 12 around the radius by flying around the first radius path 112 or the second radius path 114 so as to avoid the bounded region.

In operation, and with reference to FIG. 4, bounded inertial navigation uses the horizon or horizon line 40 to obtain platform attitude. Platform attitude represents the roll and pitch of the platform, but may also include the yaw of the platform, if necessary. The bounded inertial navigation uses overlapping imagery from different sensors on the platform 12 that have the same part of the horizon line 40 imaged in multiple sensors that are stitched together to obtain the platform attitude. This function is normally accomplished by the IMU; however, the systems of the present disclosure can utilize the IR data to gather the platform 12 attitude in lieu of, or in addition to, the IMU on the INS. This allows the legacy IR systems to slow the drift of inertial estimation of platform location. Drift of inertial navigation estimation occurs if the GPS is denied in the INS. Then, when GPS is denied, the platform 12 enters into inertial navigation. During inertial navigation, a processor integrates the angular rates output from the IMU to estimate and update the platform 12 position over time. For example, some of the inputs would be air speed coupled with the roll, pitch and yaw rates to estimate the location and guidance of the platform without GPS. However, this introduces error rates inasmuch as these systems are not flawless. The accrued error over time results in drift. Thus, using the legacy IR sensors 32 is able to slow or reduce the amount of drift over time because the image processing algorithm is able to find the horizon and fuse the IR image data with the integrated angular rates to correct the errors that have been accrued over time during inertial navigation when the GPS has been denied to reduce the amount of drift. Then when the GPS is back online and active, the GPS navigation can take over and reactivate as the primary navigation source for the platform.

In one particular example, the image from FIG. 4 containing the horizon line 40 would operate in the following manner. The auto router 16 would begin by receiving navigation data from the legacy navigation system 24, such as INS 18 on the platform 12. The navigation system includes at least one of GPS coordinates and/or INS 18 data. The auto-router 16 generates the route 110 by the legacy routing system based, at least partially, on the navigation data for use by the legacy routing system. The route destines the platform 12 towards the destination 14. The platform 12 then moves along the route 110, wherein the route is based on the sensor data from the non-navigation system 28 and the navigation data from the navigation system 24.

In this example, one of the systems may determine that the navigation system 24 is inoperable. For example, it may be determined that the navigation system 24 is inoperable by the navigation system itself, or the auto-route 16 may determine that the navigation system 24 is inoperable. The inoperability of the navigation system 24 is not time dependent. Stated otherwise, the navigation system may be inoperable for an extended period of time because it is in a GPS denied environment or it may simply be inoperable for a short period of time based on periodically going "offline." Regardless of the cause, after the determination that the navigation system is inoperable, the platform 12 continues to move along the route 110. While the platform 12 continues along the route 110, the auto-router 16 does not rely on the navigation data while the navigation system 24 is inoperable, and is able to continue the route 110 by only relying on the non-navigation data, such as the IR imagery or clutter maps generated by processing the IR imagery from the threat warning system 30. In continuance of this example, when the legacy navigation system 24 is inoperable, while the platform is moving, the auto-router 16 or another set of logic, for example login in the threat warning system 30, may bound a portion of the sensor data based on a contrast between two regions of the sensor data. Namely, bounding regions of the imagery using the horizon line 40 to distinguish between the sky region 44 and the ground region 42 in image 38. In this example, the threat warning system 30 or the auto-router 16 may detect the horizon line 40 in the sensor data obtained by the legacy sensor, such as the IR sensor. In this example, the portion of the sensor data that is bounded is based on a horizon line 40 detected in the sensor data, however it is possible for other features in the image be used to delineate one region of the image from another. For example, a vertical line could be used to segregate lateral regions of the image if such an application would require.

Within continued reference to this example, the bounding of regions in the image obtained from the non-navigation sensor may be used to reduce inertial drift calculations. The reducing inertial drift calculations may be performed in response to integrating angular rates of platform attitude while the platform is moving. In this example, this calculation may be performed after it has been determined that the legacy navigation system is inoperable. The calculations may include instructions, processes, or methods to weight the sensor data at a first weight and weighting the navigation data at a second weight when using both the sensor data and the navigation data to generate the route 110. In one example, the first weight and the second weight are different. For example, the calculations may provide more weight to the navigation data when the INS or GPS is operable. However, the calculations can be coded to provide more weight to the non-navigation data, such as the IR imagery or clutter maps, in the event the navigation system is inoperable.

As shown in FIG. 5, the three images depicted are the reference image 46 obtained from a satellite or other database, the ortho-rectified IR image 48 obtained from the legacy sensor on the platform, and an image registration result 50 overlaying the ortho-rectified image 48 over the reference image 46. In one particular embodiment, the reference image 46, which is not obtained from the platform, would be downloaded in a memory which may be on or remote from the platform 12 prior to the flight plan or route 110. The ortho-rectified image 48 is imaged from the legacy sensor 32. The reason it must be ortho-rectified is that the satellite image is taken from a far location while the IR image is taken through a bubble lens which can distort the image relative to the relatively flat image of the reference imagery. Thus, ortho-rectifying the IR image takes the relatively rounded or distorted image and projects it onto a flat plane. The purpose of comparing or overlaying the ortho-rectified image over the reference image to obtain the registration result 50 is to localize the platform 12 on a globe relative to the reference image 46. Because the overlaid registration result 50 may have a high correlation, the system may determine the location of the platform 12 based on a comparison of, or the registration between, the ortho-rectified image 48 and the reference image 46. This global localization may be beneficial in an environment where GPS is denied or the INS is otherwise offline because the auto-router needs to determine its location in space in order to properly route the platform along the flight path.

As depicted in the flow chart of FIG. 7, the sensor captures non-navigation data. In the exemplary method or flow chart, the sensor is legacy sensor 32 for capturing imagery, such as IR image data. The capturing of imagery from the legacy sensor 32 is shown generally at 702 in the box labeled "image sensor," a non-limiting example being 2CAWS, that represents one type of legacy non-navigation sensor in a threat warning system. The non-navigation data, such as IR imagery is sent for processing. There are instructions or algorithms that are used to conduct the processing of the data from the non-navigation data. In one specific embodiment the processing is performed by the threat warning system with threat warning algorithms, which is shown generally at 704. The image processing can perform its ordinary threat warning analysis such as detecting missiles or RPGs in addition to rectifying and registering the image relative to the reference image that can be used with the auto-router. Some exemplary instructions or algorithms that are implemented by the method or process of FIG. 7, or another exemplary method, may include one or more of the following, which are shown generally at 706, namely: missile detection, point of origin (POO) and temporal detections associated with the same; gunfire detection, POO and temporal detections associated with the same; and rocket propelled grenades (RPG), POO and temporal detections associated with the same.

In addition to the processing indicated above, the threat warning system may also include are instructions or algorithms that are used to conduct the processing of the data from the non-navigation data to obtain clutter metrics and perform navigation algorithm, which are shown generally at 708. Some exemplary instructions or algorithms that are implemented by the method or process of FIG. 7, or another exemplary method, may include one or more of the following, which are shown generally at 710, namely: estimated locations of GPS from the sensor that is not a primary GPS in the INS 18; ground clutter maps; sky clutter maps; obstacle locations and distance determinations; other platform, such as other aircraft locations and distance determinations; and/or communications between remote platforms.

Specifically, in FIG. 7, when the clutter map 36 is used in the method, the images may also be processed to determine the clutter values that are provided to the auto-router 16. Additionally, the algorithms can perform the image registration for geolocation without the use of GPS. These instructions or algorithms are provided to the auto-router 16 or routing system, which is shown generally at 710.

The clutter data may be accumulated over time. This provides the ability to store maps of IR data in or for the benefit of the auto-router so that it may retain the clutter information that are determined to be avoided. This may be beneficial if the clutter is sporadic. For example, if the clutter is something that is variable, the data can be stored depending on whether it is present at a certain time period. The offline feature of accumulating the database would allow the auto-router to work in an offline mode so it can remember based on the stored memory the areas of high clutter that can be analyzed offline and be input into the preflight flight plan ahead of time if those areas of clutters need to be avoided.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method, comprising:
receiving sensor data from a sensor carried by a platform, wherein the sensor is part of a non-navigation system on the platform;
transforming the sensor data into a format to be used by a routing system on the platform;
generating a route by the routing system based, at least in part, on the sensor data that has been transformed into the format for use by the routing system;

moving the platform along the route, wherein the route is based, at least in part, on the sensor data from the sensor that is part of the non-navigation system on the platform;

receiving navigation data from a navigation system on the platform, wherein the navigation system includes at least one of a global positioning system (GPS) and an inertial navigation system (INS);

generating the route by the routing system based, at least partially, on the navigation data for use by the routing system;

moving the platform along the route, wherein the route is based on the sensor data and the navigation data;

determining that the navigation system is not operable;

continuing to move the platform along the route while relying on the sensor data and not relying on the navigation data while the navigation system is inoperable; and reducing inertial drift calculations in response to integrating angular rates of platform attitude while the platform is moving and after it has been determined that the navigation system is inoperable.

2. The method of claim 1, wherein the sensor is an image sensor, further comprising:

receiving image sensor data from the sensor carried by the platform;

processing the image sensor data into the format for use by the routing system; and generating the route based, at least in part, on the image sensor data having been processed into the format for use in the routing system.

3. The method of claim 2, wherein the non-navigation system on the platform is a threat warning system, further comprising:

capturing the image sensor data during active monitoring for threats by the threat warning system;

processing the image sensor data from the threat warning system and providing a result of the processing to the routing system; and generating the route based, at least in part, on the result of processing the image sensor data from the threat warning system.

4. The method of claim 3, wherein the image sensor is a part of the threat warning system, further comprising:

capturing infrared (IR) image data by the image sensor while scanning for threats to the platform;

processing the IR image data to generate a clutter map;

wherein the clutter map is in the format for use by the routing system;

routing the platform based, at least in part, on the clutter map.

5. The method of claim 4, further comprising:

ranking clutter in the clutter map by one of (i) the threat warning system and (ii) the routing system; and generating the route based, at least in part, on the ranked clutter.

6. The method of claim 5, further comprising:

ranking the clutter based, at least in part, on pixel intensity as observed by the image sensor in the threat warning system; wherein the clutter is ranked into at least two categories, wherein at least one category results in the routing system altering the route;

determining that the ranked clutter is in the at least one category; and altering the route in response to the determination that the ranked clutter is in the at least one category.

7. The method of claim 6, further comprising:

altering the route, based on instructions from the routing system, while the platform is moving in response to active monitoring of IR image data observed by the image sensor on the threat warning system.

8. The method of claim 4, wherein processing the IR image data to generate the clutter map includes (i) ortho-rectifying the captured IR image data; (ii) registering the ortho-rectified IR image data with a reference image to obtain a registration result; and (iii) determining a location of the platform based on the registration result, and the method comprising:

guiding the platform based on the location determined from the registration result of registering the ortho-rectified IR image data obtained from the sensor in the threat warning system with the reference image.

9. The method of claim 1, further comprising:

wherein when the navigation system is inoperable while the platform is moving, bounding a portion of the sensor data based on a contrast between two regions of the sensor data.

10. The method of claim 9, further comprising:

detecting a horizon line in the sensor data obtained by the sensor;

wherein the portion of the sensor data that is bounded is based on a horizon line detected in the sensor data.

11. The method of claim 1, further comprising:

weighting the sensor data at a first weight and weighting the navigation data at a second weight when using both the sensor data and the navigation data to generate the route, wherein the first weight and the second weight are different.

12. The method of claim 1, further comprising:

dynamically updating the route in response to sensor data being collected while the platform moves.

13. The method of claim 1, further comprising:

determining that a region is to be avoided based on the sensor data obtained from the sensor;

determining, while the platform is moving, that the route will traverse the region that is to be avoided;

bounding the region that is to avoided;

generating a radius around the bounded region to be avoided;

altering the route to move the platform around the radius so as to avoid the bounded region.

14. A system comprising:

a platform adapted to move from a first location to a second location;

a navigation system on the platform;

navigation data generated by the navigation system;

a non-navigation system on the platform, the non-navigation system including at least one non-navigation sensor;

non-navigation sensor data generated by the non-navigation sensor data;

a routing system on the platform, wherein the routing system receives the non-navigation sensor data and the navigation data, said routing system, in response to a determination that the navigation system is inoperable, being configured to reduce inertial drift calculations in response to integrating angular rates of platform attitude while the platform is moving;

a route for the platform generated by the routing system, wherein the route is based on both the non-navigation sensor data and the navigation data.

15. The system of claim 14, further comprising:
wherein the non-navigation system is a threat warning system and the non-navigation sensor data is infrared (IR) sensor data; and
an IR clutter map generated by the threat warning system based on the IR sensor data, wherein clutter regions are identified in the IR clutter map.

16. The system of claim 15, further comprising:
logic to determine whether the clutter regions need to be avoided by the platform;
wherein the route is altered based on the IR clutter map for the platform to avoid the clutter regions that have been determined to be avoided by the platform as the platform traverses the route.

17. A computer program product including one or more non-transitory machine-readable mediums encoded with instructions that when executed by one or more processors cause a process to be carried out for platform routing, the process comprising:
receiving sensor data from at least one sensor carried by a platform, wherein the sensor is part of a non-navigation system on the platform;
transforming the sensor data into a format to be used by a routing system on the platform;
generating a route by the routing system based, at least in part, on the sensor data that has been transformed into the format for use by the routing system;
moving the platform along the route, wherein the route is based, at least in part, on the sensor data from the sensor that is part of the non-navigation system on the platform; and
wherein the routing system, in response to a determination that the navigation system is inoperable, being configured to reduce inertial drift calculations in response to integrating angular rates of platform attitude while the platform is moving.

18. The computer program product of claim 17 wherein the sensor data is image sensor data.

19. The computer program product of claim 17 wherein the non-navigation system is a threat warning system, further comprising:
capturing image sensor data during active monitoring for threats by the threat warning system;
processing the image sensor data from the threat warning system and providing a result of the processing to the routing system; and
generating the route based, at least in part, on the result of processing the image sensor data from the threat warning system.

* * * * *